Jan. 1, 1952     K. W. MOZUR     2,581,128
GEAR TRAIN

Filed March 22, 1947     3 Sheets-Sheet 1

INVENTOR.
Kasimier W. Mozur
BY
Florian G. Miller
Atty.

Jan. 1, 1952        K. W. MOZUR        2,581,128

GEAR TRAIN

Filed March 22, 1947        3 Sheets-Sheet 2

INVENTOR.
Kasimier W. Mozur
BY
Florian G. Miller
Atty.

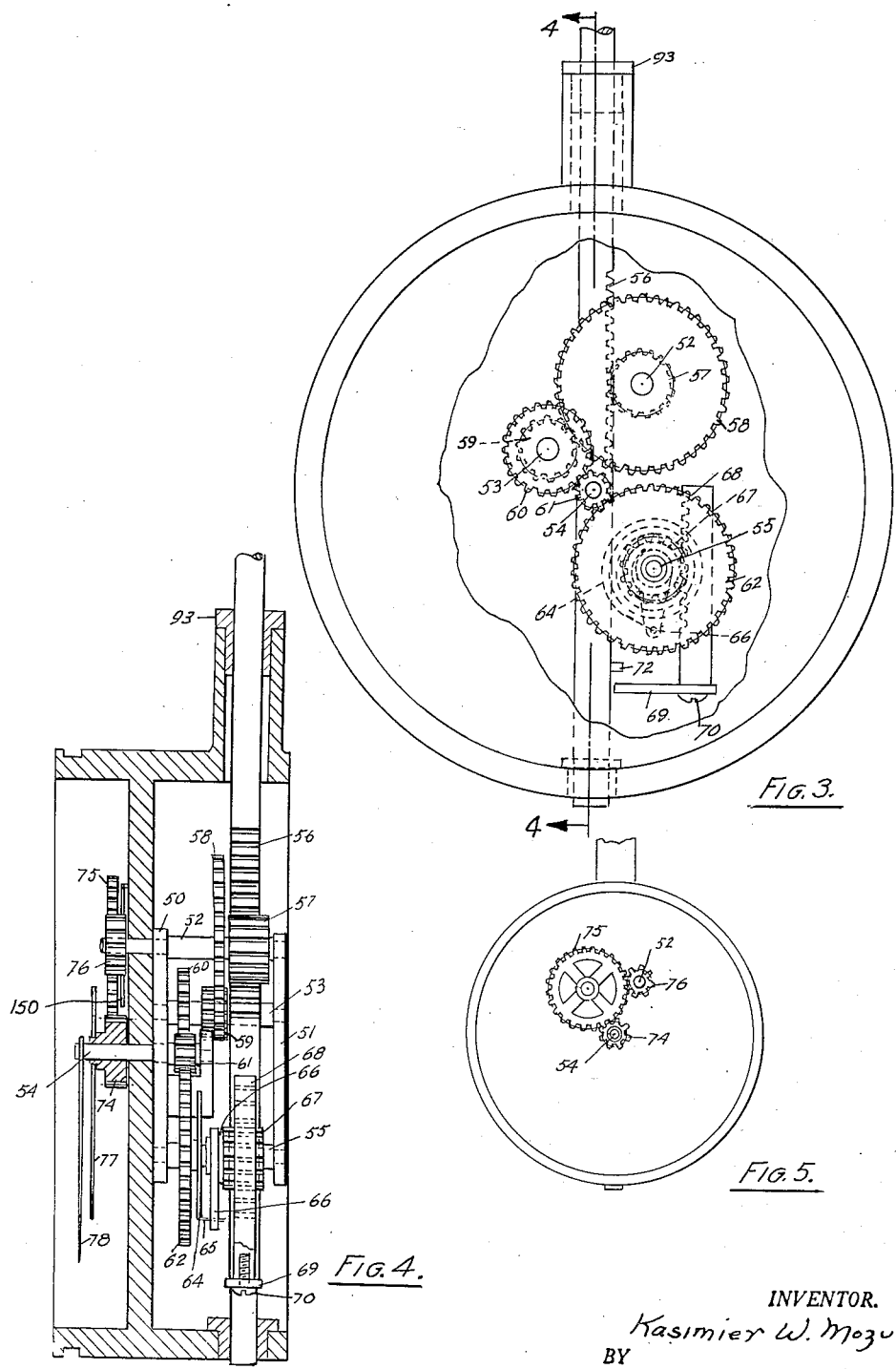

Patented Jan. 1, 1952

2,581,128

UNITED STATES PATENT OFFICE 2,581,128

GEAR TRAIN

Kasimier W. Mozur, Erie, Pa.

Application March 22, 1947, Serial No. 736,537

7 Claims. (Cl. 74—409)

This invention relates generally to gauges and more particularly to an all purpose measuring gauge for measuring depth, inside and outside diameters, and having means to obtain sines and cosines of angles.

All devices of this character, made according to the teachings of the prior art and with which I am familiar, have not been accurate for extremely close tolerances because the tension on the hair-spring is not equalized in these devices. No means has been heretofore provided in one instrument to measure depth, inside diameters, outside diameters, screw thread depths, sines and cosines of angles, etc.

It is, accordingly, an object of my invention to overcome the above and other defects in measuring instruments, and it is more particularly an object of my invention to provide an all purpose measuring instrument which is simple in construction, economical in cost, efficient in operation, and economical in manufacture.

Another object of my invention is to provide a novel equalizer for a hair-spring in a precision instrument.

Another object of my invention is to provide an all purpose measuring instrument in which all parts are adjustable.

Another object of my invention is to provide an all purpose measuring instrument which can be read by a relatively inexperienced operator.

Another object of my invention is to provide an all purpose measuring instrument which may be adapted for special purposes.

Another object of my invention is to provide a precision instrument for obtaining the sine and cosine of angles.

Other objects of my invention will become evident from the following detailed description, taken in conjunction with the accompanying drawings, in which Fig. 1 is a side elevational view of my novel all purpose gauge.

Fig. 3 is an enlarged fragmentary view of the gear and rack arrangement of the hairspring equalizer in my novel all purpose gauge.

Fig. 4 is a view taken on the line 4—4 of Fig. 3.

Fig. 5 is a fragmentary side elevational view of the gear arrangement to operate one of the indicators in my novel all purpose gauge.

Figure 1:
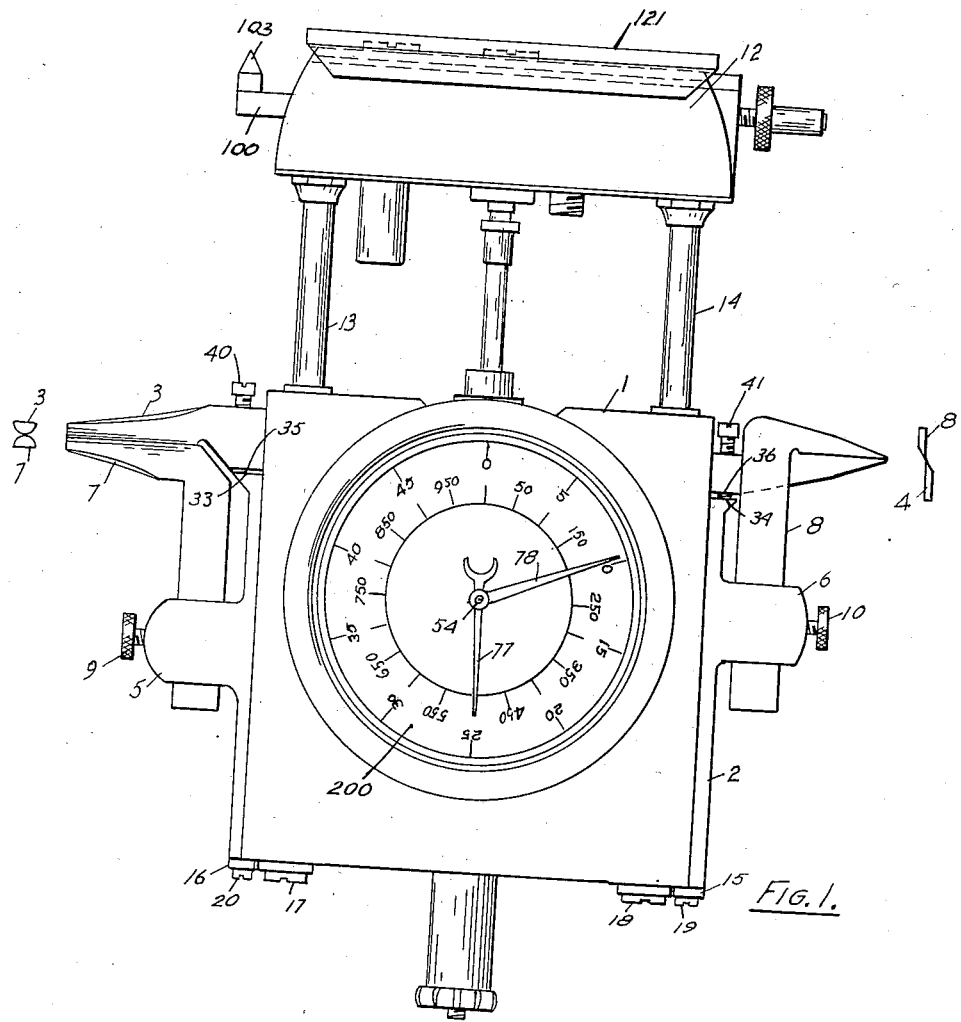
Figures 2, 6, 7:
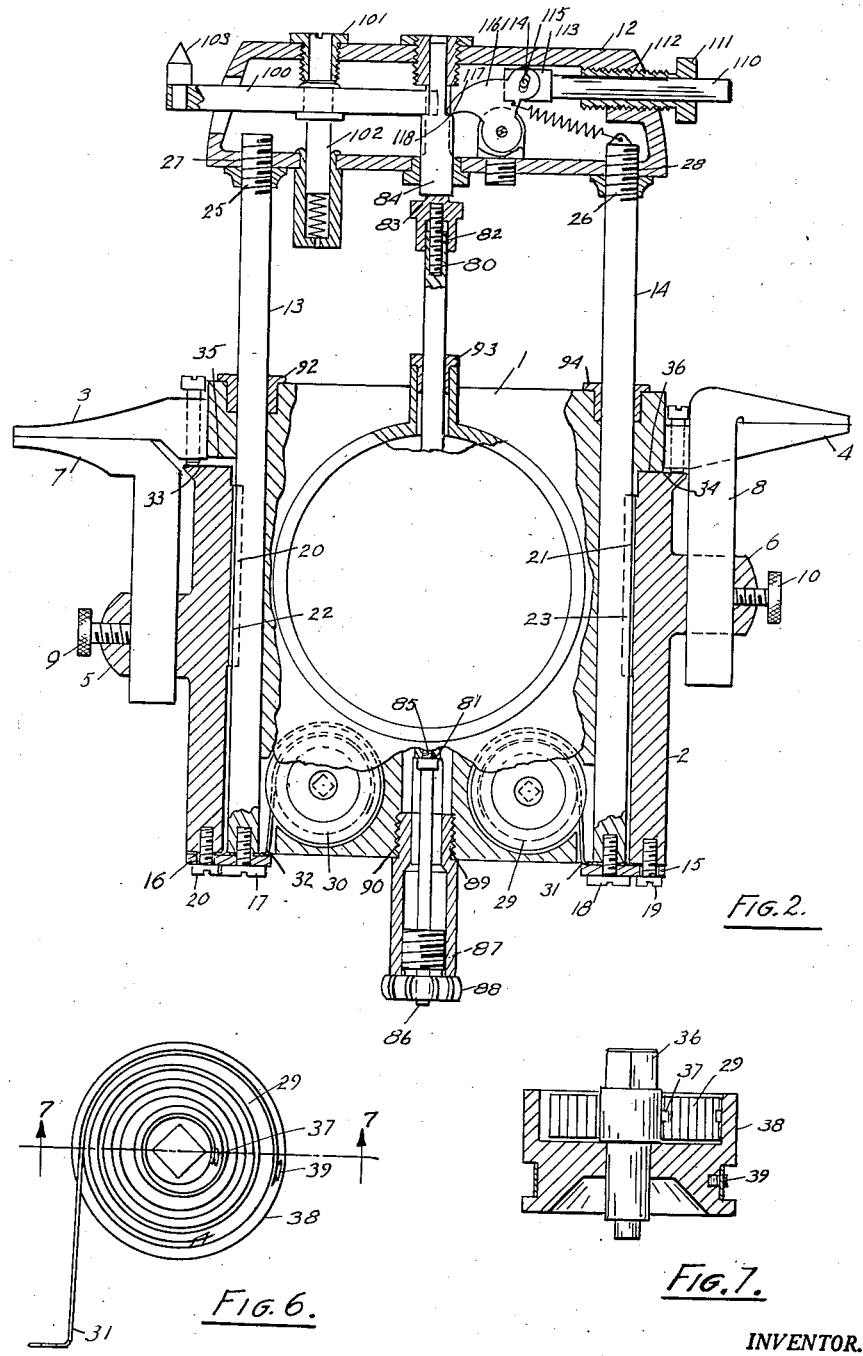
Fig. 2 is a cross-sectional view with parts broken away, taken through a vertical plane of my novel all purpose gauge.
Fig. 6 is a fragmentary side elevational view of the main-spring arrangement in my novel all purpose gauge.
Fig. 7 is taken on the line 7—7 of Fig. 6.

Referring now to the drawings, Figs. 1 througn 7, inclusive, show a box-shaped main frame 1 with a relatively movable outer frame 2. The frame 1 has a laterally extending outside caliper member 3 on one side thereof and an inside caliper member 4 extending laterally from the opposite side thereof. Outer frame 2 has apertured bosses 5 and 6 on opposite sides thereof, boss 5 having disposed therein an adjustable outside caliper member 7 for cooperation with the outside caliper member 3 on the main frame 1 and the boss 6 having an adjustable inside caliper member 8 disposed in the aperture therein for cooperation with the inside caliper member 4 on the main frame 1. Locking screw members 9 and 10 permit adjustment of the caliper members 7 and 8. Conventional extensions (not shown) may be utilized in cooperation with caliper members 3, 4, 7 and 8 when the measurement is greater than one inch. A movable box-like member 12 is spaced longitudinally of the main frame 1 and is secured to the outer member 2 by parallel rods 13 and 14, plates 15 and 16, and screw members 17, 18, 19 and 20. Rods 13 and 14 are slotted at 21 and 22 to receive projections 23 and 24 on the outer member 2. The rods 13 and 14 have threaded portions 25 and 26 for threadable engagement with threaded apertures 27 and 28 in the box-like member 12. Main-springs 29 and 30 are secured to the outer member 2 and the rods 13 and 14 by means of strap members 31 and 32 secured to the bottom of the rods 13 and 14 and movable member 2 by screw members 17, 18, 19 and 20. The spring members 29 and 30 urge the top portions 33 and 34 of the outer frame 2 against the outwardly projecting abutting portions 35 and 36 and adjustable abutting screws 40 and 41 on the main frame 1. The spring 29 is disposed on a shaft 36 in the main frame 1 and is fixed thereto by a screw member 37. The straps 31 and 32 are secured to grooved cylindrical members 38, journalled on the shafts 36 by screw members 39.

The main frame 1 has disposed therein side plates 50 and 51 having journalled therein shafts 52, 53, 54, and 55. A rack gear 56 engages pinion 57, fixedly mounted on shaft 52. Gear 58 is also fixedly mounted on shaft 52, and engages a pinion 59 fixedly mounted on shaft 53. Gear 60 is also fixedly mounted on shaft 53 and engages pinion 61 mounted on shaft 54. Pinion 61 engages gear 62 fixedly mounted on shaft 55. A hair-spring 64 has the inner end thereof attached to shaft 55, and the outer end thereof has a laterally extending portion 65, which engages an arm 66 attached to and movable with a gear 67 freely mounted on shaft 55. A second rack gear 68 has an outwardly extending arm 69 attached to the bottom thereof by a screw member 70. The outwardly extending arm 69 of the rack gear 68 is adapted to engage an outwardly extending projecting portion 72 on the rack gear 56. The arm 66 and the gear 67 are adapted to move in the same direction as that of gear 62 which is mounted on the shaft 55. A gear 74 is freely mounted on the shaft 54 and is engaged by a gear 75 which is rotated by a gear 76 on the shaft 52. The gear 74 carries an indicating arm 77 which moves twenty times as fast as indicating arm 78, fixed on the shaft 54 and movable over a dial 200 graduated to $1/1000$ of an inch. The indicating arm 78 is adapted to indicate thousandths of an inch, and indicating arm 77 is cumulative of the movement of the outer arm 78. A conventional hairspring 150 maintains tension between rack gear 56, pinion gear 57, gear 76, gear 75, and gear 74.

The rack gear shaft 56 has longitudinally extending internally threaded apertures 80 and 81 in the ends thereof. Threaded aperture 80 is adapted to receive a threaded member 82 which threadably engages an adjustable member 83, whereby the rack gear 56 may be adjusted longitudinally in relation to an abutting member 84 disposed in the box-like member 12. The oppositely disposed threaded aperture 81 in the rack gear 56 receives the threaded portion 85 of a depth measuring rod 86. Depth measuring rod 86 moves through an aperture 87 in an abutting member 88, which has a threaded portion 89 for threadably engaging threaded aperture 90 in the box-like main frame member 1. Flanged bushings 92, 93, and 94 are utilized in the main frame member 1 to guide rods 13 and 14 and the rack gear 56.

The box-like member 12 has a laterally extending shaft 100 disposed therein and held in position by a threaded abutting member 101 and a spring-urged flanged member 102. The shaft 100 has a member 103 disposed at right angles thereto on the outer end thereof for measuring depth of screw threads and the like. The pointer member 103 may also be used to move along a tapered surface to measure the tapers to determine sines, cosines, etc. Any suitable attachment may be utilized instead of the pointed member 103 on the shaft 100. On the opposite side of the box-shaped member 12 a laterally movable shaft 110 is disposed in a flanged threaded bushing 111 threadably engaging a threaded aperture 112 in the member 12. The inner end of the shaft 110 has an enlarged portion 113 with an outwardly extending pin 114 for engaging a slotted aperture 115 in a pivoted bell-crank member 116. One end 117 of the bell crank member engages a shoulder 118 on the shaft 84 and thereby moves the shaft 110 laterally upon movement of the shaft 84. A face member 121 is disposed on the box-like member 12 to provide a flat seating surface when utilizing the pointer member 103 and the outwardly movable member 110. Suitable attachments (not shown) may be disposed on the outer end of the shaft 110 to accommodate different type surfaces to be measured.

It will be evident that many forms of attachments may be utilized on my novel all purpose gauge to increase distances between caliper members 3 and 4, and 7 and 8, and the pointed member 103 may take many different forms, and many different attaching members may be disposed on the member 110 to determine sines, cosines, etc. of angular surfaces and for other purposes.

In operation, when it is desired to determine the inside diameter of an aperture, the projecting inside caliper members 3 and 7 are disposed in an aperture and the box-like member 12 is moved toward the main frame 1 until the faces of the caliper members 3 and 7 touch the sides of the aperture, whereupon a reading is made on the dial 200 by inspecting the position of the indicators 77 and 78. When it is desired to obtain the outside diameter of an object, the caliper members 4 and 8 are opened by moving the members 12 towards the main frame 1 and the caliper members 4 and 8 are disposed on the surfaces of opposite sides of the object, and the measurement is obtained by inspecting the position of the indicators 77 and 78 with respect to their position on the dial 200. When it is desired to obtain a depth reading, the bottom of the depth rod 86 which is flush with the end of the member 88 when the indicating arms 77 and 78 are zeroized is disposed over the recess to be measured. Member 12 is then moved towards main frame 1 after the abutting member 86 is placed over the aperture and when the end of the depth rod 86 reaches the bottom of the aperture, the measurement can be obtained by inspecting the position of the arms 77 and 78 on the dial 200. When it is desired to utilize the pointed member 103 for measuring a tapered surface the face member 121 is disposed on a surface adjacent the irregular surface and then moved along the surface until the desired point is reached on the tapered surface at which time the reading can be taken from the arms 77 and 78 on the dial 200. When it is desired to measure a lateral tapered surface to determine the sine, cosine or the like, the face member 121 is disposed on a flat surface adjacent the surface to be measured. The measuring rod 110 is then disposed on the tapered surface and moved along the tapered surface until the desired point is reached. The movement of the rod 110 moves the bell crank 116 and the measurement is indicated on the dial 200 by the position of the indicator arms 77 and 78.

A novel feature of my invention is the operation of my equalizing hairspring 64. When the pointer 77 moves around the dial halfway, designating one-half inch on my novel measuring instrument, the hairspring 64 reaches its maximum point of compression. Without any other intervening means, the measurements taken from the halfway point on my indicator dial 200 around to the zero point would not be accurate, inasmuch as the hairspring would be practically inoperative in its maximum compressed position. To remedy this situation, I have provided an abutting member 72 on the rack gear 56 which engages arm 69 on the rack gear 68 when the pointer arm 77 is halfway around the dial 200. The rack gear 68 engages the pinion 67, and upon further movement of the rack gear 68, the pinion 67 is rotated, with the result that the arm 66, movable with the pinion 67, engages the outwardly extending portion 65 of the hairspring 64 and tends to unwind the hairspring during the movement of the pointer arm 77 from the halfway point to the zero point on the dial 200. The tension in the hairspring 64 is therefore equalized, and an equal tension is placed on the gears and pinions 62, 61, 60, 59, and 58 at all times. The pointer arm 78, denoting a measurement of $1/1000$ of an inch on each division of the dial 200, is rotated by movement of the rack gear 56 which engages pinion gear 57, gear 58, pinion 59, gear 60, pinion 61, and gear 62. Pointer arm 77 is also rotated by rack gear 56 through pinion 57 in engagement therewith, which rotates shaft 52 with pinion 76 thereon in engagement with gear 75 which further engages gear 54 upon which the pointer arm 77 is mounted and is movable therewith. The main springs 29 and 30 urge abutting screws 35 and 36 of the main frame 1 and the abutting portions 33 and 34 of the movable frame 2 into engagement at all times.

It will be evident from the foregoing that I have provided an all purpose gauge which accurately measures depth, inside and outside diameters, lateral measurements, measurements of tapered surfaces and many other measurements required.

Various changes may be made in the specific embodiment of my invention without departing from the spirit thereof, or from the scope of the appended claims.

What I claim is:

1. In an all purpose gauge, in combination a hairspring equalizer comprising a rack having a projecting portion, main gears engaging said rack, a hairspring gear engaging said main gears, a shaft upon which said hairspring gear is fixedly mounted, a spirally-wound hairspring fixedly mounted on said shaft having a laterally extending portion, a pinion freely mounted on said shaft, an arm adapted to engage the projecting portion of said hairspring, movable with said pinion, and a second rack engaging said pinion adapted to be moved by the projecting portion of said first mentioned rack to move said arm in the direction of said hairspring gear whereby said hairspring tends to unwind when a predetermined point of rotation is reached.

2. In a precision instrument, in combination, a rack gear, an engaging gear train having one gear engaging said rack gear, indicating means operated by one of said gears in said gear train, a hairspring shaft, one of said gears in said gear train fixedly mounted on said shaft, a spiral hairspring having the inner end thereof fixedly mounted on said shaft and having the outer end thereof free, a rotatable member on said hairspring shaft, and means engaging said rotatable member movable by said rack gear upon a predetermined movement thereof whereby said rotatable member engages the free end of said hairspring to unwind same in the direction of rotation of said hairspring shaft.

3. In combination with a gear system, a rack gear, an engaging gear train having one gear engaging said rack gear, a shaft having one of said gears in said gear train fixedly mounted thereon, a spiral shaped hairspring having the inner end thereof fixed to said shaft and the outer end thereof free, rotatable means mounted on said shaft adapted to engage the free end of said hairspring to unwind same upon a predetermined rotation of said shaft and a predetermined longitudinal movement of said rack gear, and means for transferring motion from said rack gear to said rotatable means upon a predetermined longitudinal movement of said rack gear.

4. In a precision instrument, in combination, a shaft, a spiral hairspring having one end thereof fixed to said shaft and the other end thereof free, indicating means, means for rotating said shaft and for moving said indicating means in unison, rotatable means mounted on said shaft for engaging the free end of said hairspring to unwind same upon a predetermined rotation of said shaft, and means for rotating said rotating means operable by said means for rotating said shaft and for moving said indicating means in unison, upon a predetermined movement thereof.

5. In a precision instrument, in combination, a longitudinally movable member, a shaft, indicating means, means for transferring rotative force from said member to said shaft and said indicating means, a hairspring having the inner end thereof fixed to said shaft and the outer end thereof free, a rotatable member for engaging the free end of said spring to unwind same, and means for transferring motion from said longitudinally movable member to said rotatable member, upon a predetermined movement thereof for rotating said rotatable member.

6. In a precision instrument, in combination, a longitudinally movable member for engaging a piece to be measured, a shaft, indicating means, means for transferring rotative force from said member to said shaft and to said indicating means, a spiral hairspring having the inner end thereof fixed to said shaft and the outer end thereof free, a rotatable arm freely mounted on said shaft engageable with the free end of said spring, and means engagable by said longitudinally movable member for rotating said arm upon a predetermined movement thereof and a predetermined rotation of said shaft, for unwinding said hairspring.

7. In a gear system, in combination, engaging gears including a driving and a driven gear, means for rotating said gears, a shaft for mounting said driven gear, a spiral hairspring having the inner end thereof fixed to said shaft and having the outer end thereof free for maintaining tension between said engaging gears, a rotatable member on said shaft mounting said driven gear engageable with the free end of said spring, and means movable by said means for rotating said gears upon a predetermined movement thereof and upon a predetermined rotation of said driven gear for rotating said rotatable member to unwind said hairspring.

KASIMIER W. MOZUR.

REFERENCES CITED

The following references are of record in the file of this patent:

UNITED STATES PATENTS

| Number | Name | Date |
|---|---|---|
| 1,281,715 | Todt | Oct. 15, 1918 |
| 1,621,526 | Culell | Mar. 22, 1927 |
| 1,796,992 | Helm et al. | Mar. 17, 1931 |
| 1,820,370 | Aldeborgh et al. | Aug. 25, 1931 |
| 2,196,231 | Ridgway | Apr. 9, 1940 |

FOREIGN PATENTS

| Number | Country | Date |
|---|---|---|
| 38,311 | Denmark | Jan. 2, 1928 |